United States Patent
Poncelas

(10) Patent No.: US 12,518,212 B2
(45) Date of Patent: Jan. 6, 2026

(54) INFORMATION PROCESSING APPARATUS AND INFORMATION PROCESSING METHOD

(71) Applicant: Rakuten Group, Inc., Tokyo (JP)

(72) Inventor: Alberto Poncelas, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 265 days.

(21) Appl. No.: 18/079,281

(22) Filed: Dec. 12, 2022

(65) Prior Publication Data

US 2023/0186163 A1 Jun. 15, 2023

(30) Foreign Application Priority Data

Dec. 14, 2021 (JP) ................................ 2021-202244

(51) Int. Cl.
*G06N 20/00* (2019.01)
*G06F 40/166* (2020.01)
(Continued)

(52) U.S. Cl.
CPC ........... *G06N 20/00* (2019.01); *G06F 40/166* (2020.01); *G06F 40/253* (2020.01); *G06F 40/289* (2020.01); *G06F 40/47* (2020.01)

(58) Field of Classification Search
CPC ....... G06N 20/00; G06F 40/253; G06F 40/47; G06F 40/166; G06F 40/289
See application file for complete search history.

(56) References Cited

U.S. PATENT DOCUMENTS

| 11,586,878 B1* | 2/2023 | Delany .................... G06N 3/08 |
| 2020/0034435 A1 | 1/2020 | Norouzi et al. |

(Continued)

FOREIGN PATENT DOCUMENTS

| JP | 4-191969 A | 7/1992 |
| JP | 2019-537096 A | 12/2019 |

(Continued)

OTHER PUBLICATIONS

Naoya Arima et al., "Stylistic Classification Using a Sentence-Final Expression Dictionary and Its Application", DEIM Forum, 2018, pp. 2-10 (10 total pages).

(Continued)

*Primary Examiner* — Bhavesh M Mehta
*Assistant Examiner* — Edward Tracy, Jr.
(74) *Attorney, Agent, or Firm* — Sughrue Mion, PLLC

(57) ABSTRACT

Disclosed herein is an information processing apparatus, comprising: a data set acquisition unit configured to acquire a first training data set that stores training data in which a first natural language sequence is correlated to a second natural language sequence; an analysis unit configured to extract a segment indicating either non-honorific or honorific expressions from the second natural language sequence in the first training data set, and analyze the extracted segment; and a data set conversion unit configured to convert, based on an analysis result of the segment, the first training data set into a second training data set that is different from the first training data set and in which the honorific expression in the second natural language sequence is enriched over the non-honorific expression with respect to the first training data set.

16 Claims, 14 Drawing Sheets

(51) Int. Cl.
*G06F 40/253* (2020.01)
*G06F 40/289* (2020.01)
*G06F 40/47* (2020.01)

(56) References Cited

U.S. PATENT DOCUMENTS

| | | | |
|---|---|---|---|
| 2020/0320984 A1* | 10/2020 | Kuczmarski | G06N 20/00 |
| 2021/0097242 A1* | 4/2021 | Yoon | G06F 40/47 |
| 2021/0304741 A1* | 9/2021 | Cavallari | G10L 15/26 |
| 2021/0390271 A1 | 12/2021 | Norouzi et al. | |
| 2023/0051960 A1* | 2/2023 | Sonneveldt | G06N 3/042 |

FOREIGN PATENT DOCUMENTS

| | | |
|---|---|---|
| JP | 2020-126360 A | 8/2020 |
| WO | 2018/058046 A1 | 3/2018 |

OTHER PUBLICATIONS

Hisatoshi Ikuta et al., "Translation Accuracy Improvement by Customization of a Machine Translation Model for Multilingual Translation Solutions", Panasonic Technical Journal, Nov. 2019, vol. 65 No. 2, pp. 47-49 (5 total pages).

* cited by examiner

| HONOFIRIC EXPRESSION LEVEL | SEQUENCE | |
|---|---|---|
| Informal | Eki no chikaku ni takusanno omise ga aru. | 41 |
| Polite | Eki no chikaku ni takusanno omise ga arimasu. | 42 |
| Formal | Eki no chikaku ni takusanno omise ga gozaimasu. | 43 |

FIG. 7

| HONORIFIC EXPRESSION LEVEL | VERB MORPHEMES |
|---|---|
| Informal | da; datta; janai; janakatta; darou; dakara; dakedo; datte; dakke; souda; youda — 71 |
| Polite | desu; deshita; nai; nakatta; masu; mashita; masen; mashou; deshou; kudasai; nasai; dearu; dehanai — 72 |
| Formal | gozaimasu; irasshaimasu; orimasu; nasaimasu; itashimasu; goranni narimasu; haiken shimasu; omeni kakarimasu; oideni narimasu; ukagaimasu; mairimasu; zonjimasu; zonjiagemasu; meshiagarimasu; itadaku; itadakimasu; itadaite; sashiagemasu; kudasaimasu; osshaimasu; moushiagemasu — 73 |

FIG. 10

| SOURCE SEQUENCE | The number at the bottom of the list drops off. | ←101 |
| TAGGED SOURCE SEQUENCE | < polite > The number at the bottom of the list drops off. | ←102 |
| TARGET SEQUENCE | List no ichiban shita ni aru bangou ga list kara sakujo saremasu. | ←103 |

INFORMATION PROCESSING APPARATUS AND INFORMATION PROCESSING METHOD

CROSS-REFERENCE TO RELATED APPLICATIONS

This application is related to and claims priority under 35 U.S.C. 119 (a) to Japanese patent application No. 2021-202244 filed on Dec. 14, 2021, of which disclosure including the specification, drawings and abstract is incorporated herein by reference in its entirety.

TECHNICAL FIELD

The present invention relates to an information processing apparatus, an information processing method and a program thereof, and more particularly, to a technique for machine-learning a learning model for machine translation.

BACKGROUND ART

Conventionally, a certain technique has been known that uses neural networks to machine translate texts in natural languages as one of applications of natural language processing.

A learning model for machine translation constituted with neural networks is typically equipped with a neural network of encoders, which is an input language processor, and a neural network of decoders, which is an output language processor. Such learning model takes as an input a text sequence in a source language, which is the translation source, and infers and outputs a text sequence in a target language, which is the translation target.

Patent Literature 1 discloses a machine translation system using neural networks.

More specifically, an encoder neural network of the neural machine translation system disclosed in Patent Literature 1 is equipped with an input forward Long Short Term Memory (LSTM) layer, which generates a forward representation of each of input tokens in an input text sequence, an backward LSTM layer, which generates an inverse representation of each of the input tokens in the input text sequence, a combinational layer, which generates a combinational representation of the input tokens by combining the forward and inverse representations of the input tokens, and multiple hidden LSTM layers, each of which generates an encoded representation of each of the input tokens by processing each of the combinational representations in the forward direction.

A decoder neural network of the neural machine translation system is equipped with multiple LSTM layers, each of which processes an attentional context vector at a given location as a weighted sum over the encoded representation of each of the input tokens and an output token for each of multiple locations in an output text sequence, and a Softmax output layer, which generates a score for each of output tokens to produce the output text sequence.

LISTING OF REFERENCES

Patent Literature

PATENT LITERATURE 1: Japanese Translation of PCT International Application Publication No. JP-T-2019-537096

SUMMARY OF THE INVENTION

Problems to be Solved by the Invention

Meanwhile, when the target language, which is the translation target, has honorific expressions, a single source language text (i.e., input sequence) may output multiple target language texts (i.e., output sequences) with the same meaning.

For example, assuming that the source language is English and the target language is Japanese, the translation source text "I don't have time today." may be translated into a non-honorific expression "Kyou ha jikan ga nai." or an honorific expression "Kyou ha jikan ga arimasen.".

Although the above non-honorific expression and honorific expression are equivalent expressions with the same semantic content, unless one of hon-honorific and honorific expressions is appropriately selected according to the context in a broad sense, including the reader of the text, the conversational partner, or the situation in which the text is used, the translation quality in machine translation would be likely to be deteriorated.

However, in conventional neural machine translation systems, even when the target language, which is the translation target, has the honorific expressions (i.e., honorifics), the presence or absence of the above honorific expressions has not been sufficiently taken into consideration when training a learning model.

This would result in learning models failing to be sufficiently trained with the honorific expressions in the target languages, which in turn would deteriorate the translation quality of the machine translation that infers using trained learning models.

The present invention has been made in order to solve the above mentioned problems and an object thereof is to provide an information processing apparatus, an information processing method and a program product thereof that are capable of obtaining machine translation results with higher accuracy even when the target language of the machine translation includes honorific expressions.

Solution to Problems

In order to solve the above mentioned problems, according to one aspect of the present invention, there is provided an information processing apparatus, comprising: a data set acquisition unit configured to acquire a first training data set that stores training data in which a first natural language sequence, which is a machine translation source, is correlated to a second natural language sequence, which is a machine translation target; an analysis unit configured to extract a segment indicating either non-honorific or honorific expressions from the second natural language sequence in the first training data set acquired by the data set acquisition unit, and analyze the extracted segment; a data set conversion unit configured to convert, based on an analysis result of the segment by the analysis unit, the first training data set into a second training data set that is different from the first training data set and in which the honorific expression in the second natural language sequence is enriched over the non-honorific expression with respect to the first training data set; and a training unit configured to input the second training data set converted by the data set conversion unit into a learning model to train the learning model.

The analysis unit may extract, as the segment, an inflectable portion from the second natural language sequence in the first training data set.

The information processing apparatus may further comprise: a classifier configured to classify the segment extracted by the analysis unit into any of honorific expression levels, and the data set conversion unit may convert the first training data set to the second training data set based on a classification result of the honorific expression levels output by the classifier.

The data set conversion unit may assign the classification result of the honorific expression levels output by the classifier to the first natural language sequence to be stored in the second training data set.

The data set conversion unit may replace the segment in the second natural language sequence with a segment in the honorific expression and output the second natural language sequence to the second training data set.

The data set conversion unit may refer to a conversion rule that defines a verb morpheme for each of the honorific expression levels, and convert, using text matching, the segment in the second natural language sequence into a segment in the honorific expression to be output to the second training data set.

The data set conversion unit may generate a segment indicating an honorific expression level other than an honorific expression level indicated by the segment extracted by the analysis unit, generate the second natural language sequence including the generated segment, and generate a plurality of said second training data sets corresponding to a plurality of said second natural language sequences, respectively.

The data set conversion unit may identify a segment indicating the honorific expression among the segments extracted by the analysis unit, and output, to the second training data set, the second natural language sequence including the identified segment and the corresponding first natural language sequence.

The data set conversion unit may convert the first training data set into the second training data set in which a lower honorific expression is enriched over the non-honorific expression among multiple honorific expression levels belonging to the honorific expression.

The learning model may have a plurality of output channels that corresponds to the non-honorific expression and the honorific expression, respectively.

According to another aspect of the present invention, there is provided an information processing method executed by an information processing apparatus, comprising steps of: acquiring a first training data set that stores training data in which a first natural language sequence, which is a machine translation source, is correlated to a second natural language sequence, which is a machine translation target; extracting a segment indicating either non-honorific or honorific expressions from the second natural language sequence in the acquired first training data set, and analyze the extracted segment; converting, based on an analysis result of the segment, the first training data set into a second training data set that is different from the first training data set and in which the honorific expression in the second natural language sequence is enriched over the non-honorific expression with respect to the first training data set; and inputting the converted second training data set into a learning model to train the learning model.

According to yet another aspect of the present invention, there is provided an information processing program product for causing a computer to execute information processing, the program product causing the computer to execute processing comprising: a data set acquisition process for acquiring a first training data set that stores training data in which a first natural language sequence, which is a machine translation source, is correlated to a second natural language sequence, which is a machine translation target; an analysis process for extracting a segment indicating either non-honorific or honorific expressions from the second natural language sequence in the first training data set acquired by the data set acquisition process, and analyze the extracted segment; a data set conversion process for converting, based on an analysis result of the segment by the analysis process, the first training data set into a second training data set that is different from the first training data set and in which the honorific expression in the second natural language sequence is enriched over the non-honorific expression with respect to the first training data set; and a training process for inputting the second training data set converted by the data set conversion process into a learning model to train the learning model.

Advantageious Effect of the Invention

According to the present invention, it makes it possible to obtain machine translation results with higher accuracy even when the target language of the machine translation includes honorific expressions.

The above mentioned and other not explicitly mentioned objects, aspects and advantages of the present invention will become apparent to those skilled in the art from the following embodiments (detailed description) of the invention by referring to the accompanying drawings and the appended claims.

BRIEF DESCRIPTION OF DRAWINGS

FIG. 7 is a schematic diagram illustrating exemplary honorific expression conversion rules referred to by the data set conversion unit of the learning model controller apparatus according to the first embodiment.

FIG. 10 is a schematic diagram illustrating an example of tagging (i.e., labeling) of the honorific expression level to a source sentence in the data set conversion processing according to the second embodiment.

DESCRIPTION OF EMBODIMENTS

Figure 1:
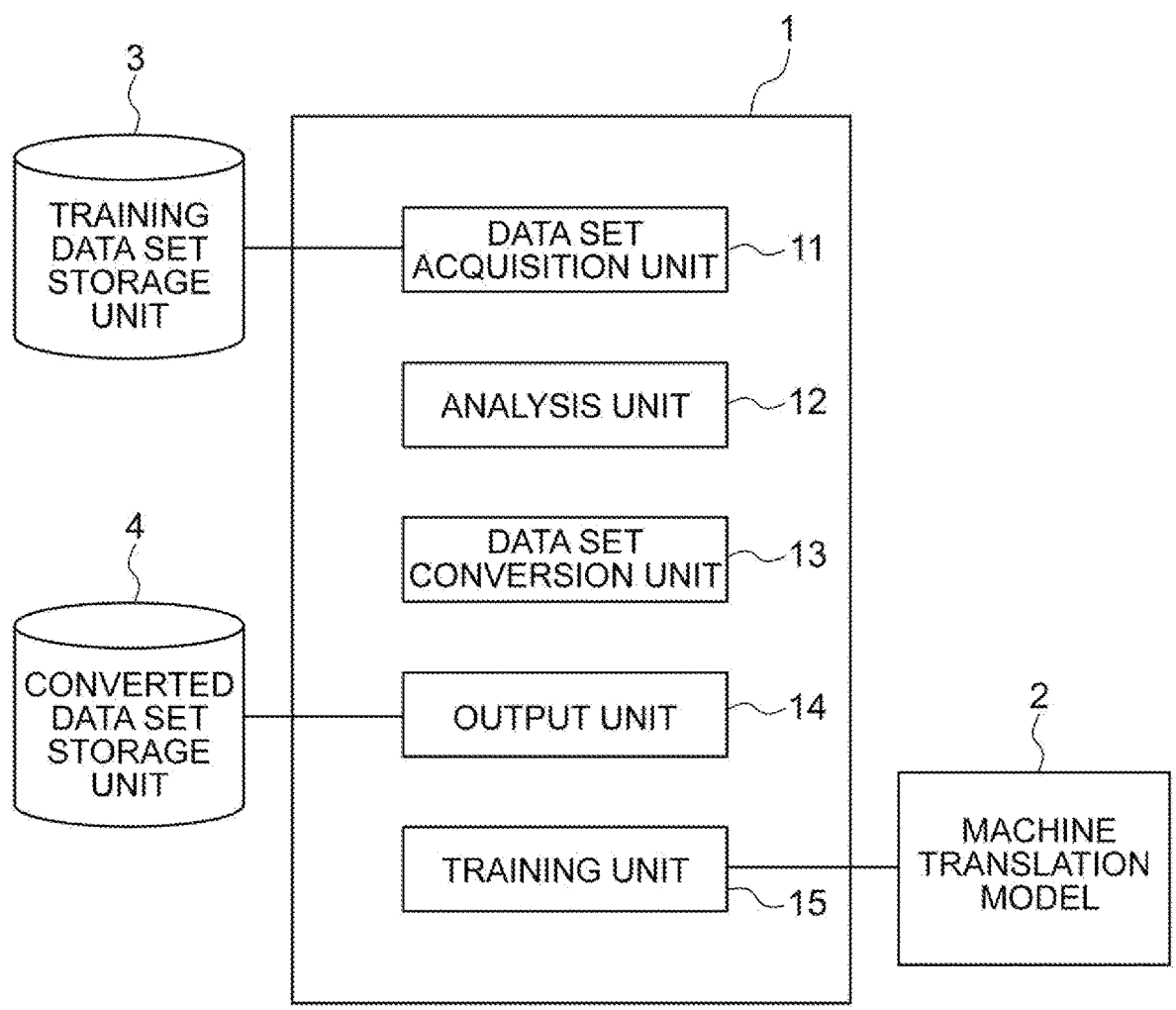
FIG. 1 is a block diagram illustrating an exemplary functional configuration of a learning model controller apparatus according to respective embodiments of the present invention.

Hereinafter, embodiments of the present invention will be described in detail with reference to the accompanying drawings. Among the constituent elements disclosed herein, those having the same function are denoted by the same reference numerals, and a description thereof is omitted. It should be noted that the embodiments disclosed herein are illustrative examples as means for implementing the present invention, and should be appropriately modified or changed depending on a configuration and various conditions of an apparatus to which the present invention is applied, and the present invention is not limited to the following embodiments. Furthermore, it should be noted that all of the combinations of features described in the following embodiments are not necessarily essential to the solution of the present invention.

First Embodiment

A learning model controller apparatus according to the present embodiment acquires a training data set that correlates sequences in a source language, which is the translation source, to sequences in a target language, which is the translation target and stores therein, analyzes the acquired training data set, and converts the acquired training data set to a training data set in which honorific expressions are enriched over non-honorific expressions as compared to the acquired training data set.

The learning model controller apparatus according to the present embodiment also uses the converted training data set to machine-learn a training model for machine translation.

Hereinafter, a certain example will be described in which the present embodiment machine-learns a learning model for machine translation using English as the source language, which is the translation source, and Japanese as the target language, which the translation target. However, the present embodiment is not limited thereto.

The present embodiment is applicable to any machine translation for languages that include honorific expressions. Furthermore, the present embodiment is not limited to honorific expressions but applicable to any learning models that is able to machine translate a single sequence in the source language into multiple semantically equivalent sequences in the target language.

Yet furthermore, although in the following, a certain example will be described in which the present embodiment analyzes honorific expression levels by focusing on the inflection of sequences in Japanese, which is the target language, the present embodiment is not limited thereto. For example, the present embodiment may analyze the honorific expression levels by analyzing the types of nouns and pronouns described in sequences using, e.g., morphological analysis.

<Functional Configuration of Learning Model Controller Apparatus>

FIG. 1 is a block diagram illustrating an exemplary functional configuration of the learning model controller apparatus 1 according to the present embodiment.

The learning model controller apparatus 1 illustrated in FIG. 1 includes a data set acquisition unit 11, an analysis unit 12, a data set conversion unit 13, an output unit 14, and a training unit 15. The learning model controller apparatus 1 machine-learns a learning model for machine translation (hereinafter referred to as "machine translation model") 2 using the training data set stored in a training data set storage unit 3 and the converted data set stored in a converted data set storage unit 4.

The learning model controller apparatus 1 may be communicatively connected to a client device constituted with a Personal Computer (PC), or the like (not shown) via a network. In this case, the learning model controller apparatus 1 may be implemented in a server, and the client device may provide a user interface for the learning model controller apparatus 1 to perform input/output of information to/from the outside and may also be equipped with some or all of the respective components 11 to 15.

The data set acquisition unit 11 acquires a training data set to be converted in the machine learning processing according to the present embodiment from the training data set storage unit 3, and supplies the acquired training data set to the analysis unit 12.

The training data set storage unit 3 is constituted with a non-volatile storage device such as a Hard Disk Drive (HDD), a Solid State Drive (SSD), or the like, and stores the training data set for training the machine learning model 2. The training data set may be a parallel data set that stores sequences in the source language, which is the translation source, and sequences of the target language, which is the translation destination, as pairs, respectively. However, the present embodiment is not limited thereto, and it may suffice as long as the source language sequence and the target language sequence are logically associated with each other.

Each of the source and target language sequences may be, for example, a single sentence terminated by, for example, a period, punctuation mark, or alternatively may be a paragraph containing multiple sentences.

A sequence pair of the source language and the target language stored in the training data set storage unit 3 are respectively the teacher data (i.e., labeled training data) for pre-training the machine translation model 2. The source language sequence that is paired with the target language sequence indicates the correct answer in the machine translation inference.

The data set acquisition unit 11 may acquire the training data set to be converted by reading a training data set stored in advance in the training data set storage unit 3, or alternatively the data set acquisition unit 11 may receive the training data set via a communication I/F from the same or different counterpart device that stores the training data set.

The data set acquisition unit 11 also accepts input of various parameters necessary to perform the machine learning processing in the learning model controller apparatus 1. The data set acquisition unit 11 may accept input of various parameters via a user interface of a client device that is communicatively connected to the learning model controller apparatus 1.

The analysis unit 12 analyzes the training data set supplied from the data set acquisition unit 11 and supplies the analysis results to the data set conversion unit 13.

More specifically, the analysis unit 12 may determine the level of honorific expression in a sequence in the target language (hereinafter also referred to as "target sequence") by analyzing the inflection (e.g., verb conjugations) described in the sequence in the target language in the training data set. The analysis unit 12 may also determine an inflectable segment in the target sequence (e.g., verb conjugation) as the segment of interest. In other words, the segment of interest is a segment in the target sequence in which different inflected words may be described at the end of a sentence at different honorific expression levels, respectively. The details of this determination processing performed by the analysis unit 12 will be described below with reference to FIG. 4.

The data set conversion unit 13 converts the training data set based on the analysis results on the honorific expression level supplied from the analysis unit 12, and supplies the converted data set to the output unit 14.

According to the present embodiment, the data set conversion unit 13 generates the converted data set by converting all the segments of interest in all target sequences in the training data set acquired by the data set acquisition unit 11 into the honorific expressions. In other words, the converted data set is a data set in which the honorific expressions are enriched over the non-honorific expressions as compared to the training data set before being converted.

Furthermore, according to the present embodiment, the data set conversion unit 13 may convert the training data set including the conversion of the segment of interest, without determining the honorific expression level for the target sentence by the analysis unit 12.

More specifically, the data set conversion Unit 13 converts a target sequence having an inflectable ending described in the non-honorific expression into another target sequence having an inflectable ending described in the honorific expression.

On the other hand, the data set conversion unit 13 may output the target sequence having an inflectable ending described in the honorific expression straightforwardly to the converted data set, or alternatively, may convert into a target sequence having an inflectable ending described in the honorific expression at different levels. The details of this data set conversion processing performed by the data set conversion section 13 will be described below with reference to FIGS. 5 to 7.

The output unit 14 outputs the converted data set supplied from the data set conversion unit 13 to the converted data set 4. The output unit 14 may also display and output all or part of the converted data set via a display device or the like.

The converted data set storage unit 4 is, similarly to the training data set storage unit 3, constituted with a non-volatile storage device such as the HDD, the SSD, or the like, and stores the converted data set for training the machine translation model 2. Similarly to the training data set, the converted data set may be a parallel data set that stores sequences in the source language (hereinafter also referred to as "source sequences"), which is the translation source, and sequences in the target language (hereinafter referred to as "target sequences"), which is the translation target, as pairs, respectively.

The training unit 15 inputs the converted data set stored in the converted data set storage unit 14 as training data into the machine translation model 2 to cause the machine translation model 2 to machine-learn the set of parameters for machine translating the source sequences into the target sequences.

The machine translation model 2 may be a trained machine translation model 2 that has been pre-trained with the training data set before being converted stored in the training data set storage unit 3.

In this case, the training unit 15 uses the converted data set converted by the data conversion unit 13 to additionally train the pre-trained machine translation model 2 and fine-tunes the set of parameters for machine translation with the honorific expressions in the target sequences being taken into consideration.

The trained machine translation model 2, which has been trained through the above training phase, is capable of outputting multiple target sequences including non-honorific and honorific expressions from a single source sequence in the inference phase. In other words, the machine translation model 2 may be equipped with multiple output channels that output multiple target sequences containing the non-honorific and the honorific expressions, respectively.

Alternatively, the machine translation model 2 may take as input a source sequence to which a desired honorific expression level is assigned or appended as a tag (i.e., token) and selectively output a target sequence containing the honorific expression level that coincides with the honorific expression level assigned to the source sequence. The machine translation model 2 may also selectively output a target sequence containing one of the multiple honorific expression levels by analyzing contextual features or according to an instruction input from a user.

<Exemplary Network Configuration of Machine Translation Model>

Figure 2:
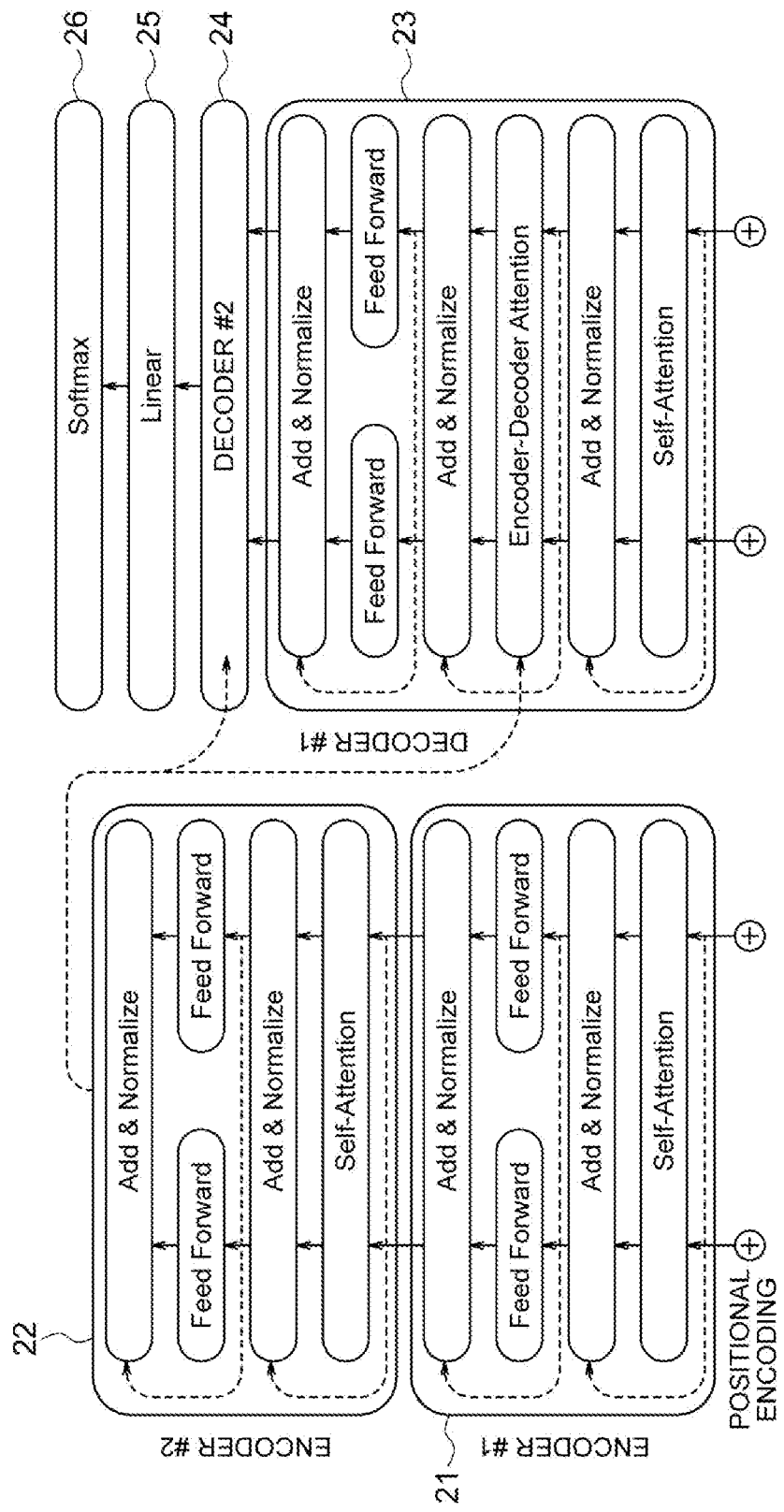
FIG. 2 is a conceptual diagram illustrating an exemplary network configuration when the learning model controller apparatus according to the present embodiment is implemented in neural networks.

FIG. 2 is a conceptual diagram illustrating an exemplary network configuration when the machine translation model 2, which is the learning model to be trained by the learning model controller apparatus 1 according to the present embodiment, is implemented in neural networks.

FIG. 2 illustrates an example in which the machine translation model 2 is implemented in a Transformer based model that performs the neural machine translation. However, the networks that is able to implement the machine translation model 2 are not limited to the Transformer based model, and may be implemented in networks having any structure, for example, the Recurrent Neural Network (RNN) or the Convolutional Neural Network (CNN).

Referring to FIG. 2, the machine translation model 2 includes an encoder section and a decoder section, each of which is input with different time series data.

The encoder section is constituted with stacked multiple encoders 21, 22 . . . having the same structure. For example, six encoders may be stacked. The decoder section is constituted with stacked multiple decoders 23, 24 . . . having the same structure. For example, six decoders may be stacked.

Each of the multiple encoders 21, 22 . . . processes each element (i.e., input word) in a source sequence in the source language, which is the translation source.

Each element in the source sequence in the source language, which is the translation source, is compressed by an embedding layer (not shown) into, for example, 512-dimensional vectors, and positional information is added thereto by a positional encoding layer. A self-attention layer of the encoder 21 acquires alignment information (similarity, importance, and the like) between elements in the input sequence (i.e., same sequence) and adds the acquired alignment information to each of the vectors. The output of the self-attention layer undergoes various normalization processes, and then an activation function is applied in the feed-forward network (i.e., fully connected layer) to determine the final output value, which is further normalized. The same processes are iterated in the subsequent encoders 22 and beyond.

Each of the multiple decoders 23, 24 . . . processes each element (i.e., input word) in a target sequence in the target language, which is the translation target.

Similarly to the encoder 21, in the decoder 23, each element in the target sequence is compressed by an embedding layer (not shown) into, for example, 512-dimensional vectors, and positional information is added thereto by a positional encoding layer. A self-attention layer of the decoder 23 acquires the alignment information between elements in the same sequence and adds the acquired alignment information to each of the vectors. In the decoder 23, an attention mechanism (i.e., Encoder-Decoder Attention) acquires the alignment information between elements in the source sequence and the target sequence, using the output from the self-attention layer, which has undergone various normalization processes, as a query, and the output from the encoder section as a key and a value, and adds the acquired alignment information to each of the vectors.

The output of the self-attention layer undergoes various normalization processes, and then an activation function is applied in the feed-forward network (i.e., fully connected layer) to determine the final output value, which is further normalized. The same processes are iterated in the subsequent decoders 24 and beyond.

The output of the decoder section is converted into logit vectors with the same cell width as the output vocabulary by the linear layer 25, and a Softmax layer 26 calculates the predicted probability of each of cells. The machine translation model 2 finally selects the cell with the highest probability and outputs a word associated with the selected cell as the expected translation.

<Machine Learning Processing Performed by Learning Model Controller Apparatus 1>

Figure 3:
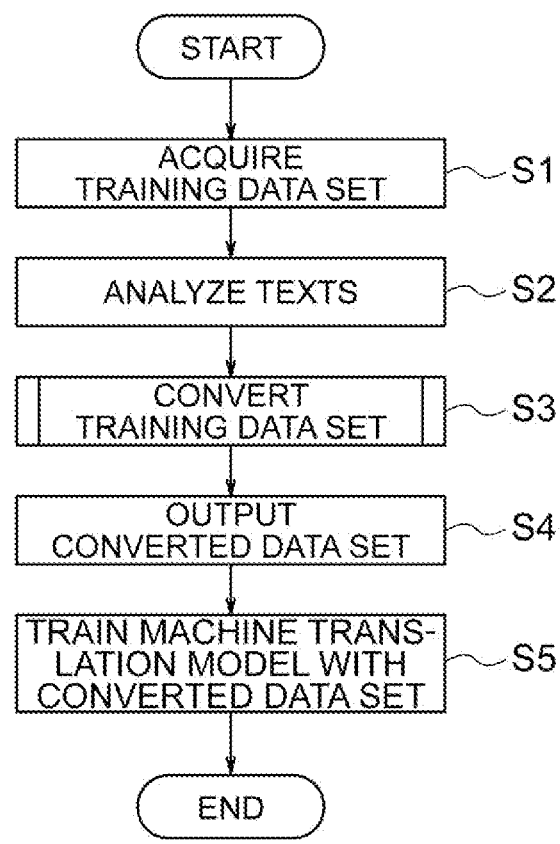
FIG. 3 is a flowchart illustrating an exemplary outline processing procedure of the machine learning processing performed by the learning model controller apparatus according to the present embodiments.

FIG. 3 is a flowchart illustrating an exemplary processing procedure of machine learning processing performed by the learning model controller apparatus 1 according to the present embodiment.

It should be noted that each step shown in FIG. 3 may be performed by the CPU reading and executing a program stored in the storage device such as an HDD of the learning model controller apparatus 1. Alternatively, at least a part of the flowchart shown in FIG. 3 may be carried out by a hardware. When implemented by the hardware, for example, by using a predetermined compiler, a dedicated circuit may be automatically generated on a Field Programmable Gate Array (FPGA) from programs for implementing the respective steps. Furthermore, a gate array circuitry may be formed in the same manner as the FPGA and implemented as the hardware. Yet furthermore, it may be implemented by an Application Specific Integrated Circuit (ASIC).

In step S1, the data set acquisition unit 11 of the learning model controller apparatus 1 reads the training data set from the training data set storage unit 3 to acquire the training data set to be processed.

The training data set read from the training data set storage unit 3 in step S1 is a data set for training the machine translation model 2. For example, the training data set may be a parallel data set that stores sequences in the source language (i.e., source sequence), which is the translation source, and sequences in the target language (i.e., target sequence), which is the translation target, as pairs, respectively.

In step S2, the analysis unit 12 of the learning model controller apparatus 1 analyzes the training data set acquired in step S1.

More specifically, the analysis unit 12 may determine the honorific expression level in the target sequence by analyzing the inflection (e.g., verb conjugations) described in the target sequence in the training data set. The analysis unit 12 may also determine an inflectable segment (e.g., verb conjugation) in the target sequence as the segment of interest.

The details of the determination of honorific expression levels will be described below with reference to FIG. 4.

Figures 4, 5:
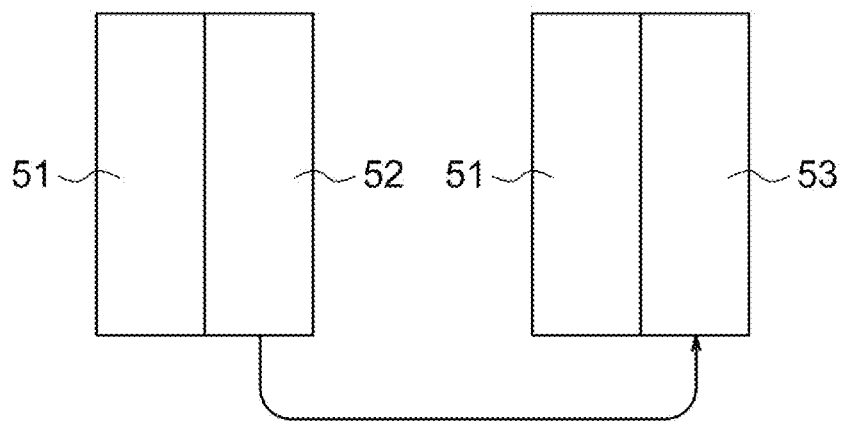
FIG. 4 is a schematic diagram illustrating an example of multiple honorific expression levels in the target language.
FIG. 5 is a schematic diagram illustrating an exemplary data set conversion processing performed by the data set conversion unit of the learning model controller apparatus according to a first embodiment.

FIG. 4 illustrates an example of multiple honorific expression levels in the target language.

Assuming that the target language for translation is Japanese, referring to FIG. 4, three honorific expressions levels 41 to 43 are derived from a single sentence meaning.

The three honorific expression levels 41 to 43 have the same sentence meaning, and all of them correspond to a sentence in English "There are many shops near the train station."

The honorific expression level 41 is non-honorific (i.e., informal) and is described by the sentence "Eki no chikaku ni takusanno omise ga aru.". The honorific level 42 is polite and is described by the sentence "Eki no chikaku ni takusanno omise ga arimasu.". The honorific Level 43 is honorific (i.e., formal) and is described by the sentence "Eki no chikaku ni takusanno omise ga gozaimasu.". Both of the honorific expression levels 42 and 43 belong to honorific expressions, but the honorific expression level 43, which is formal, is a higher level of honorific expression than the honorific expression level 42, which is polite.

Respective sentences in the honorific expression levels 41 to 43 are different from one another in the ending descriptions "aru.", "arimasu.", and "gozaimasu.". In other words, it can be understood that the honorific expression level may be determined by paying attention to the inflection in the source sequence or the target sequence, typically the verb conjugation of a major verb.

According to the present embodiment, the analysis unit 12 of the learning model controller apparatus 1 identifies, as the segment of interest, the part of the inflection in the target sequence, in other words, the part of the verb conjugation at the ending of a sentence, as the segment of interest.

It should be noted that the present embodiment is not limited thereto, and other honorific expression levels may be identified. For example, similarly to the above honorific expressions, it is possible to identify humble or modest expressions such as "ukagau." and "moushiageru.", and courteous expressions such as "mairu.", and "mousu.", by paying attention to the inflection caused by the conjugation of verbs in the sequence. Furthermore, it is possible to identify, for example, beautifying expressions such as "o-ryouri" and "go-juusho" by paying attention to prefixes added to nouns in the sequence. Yet furthermore, honorific expression levels may be identified by morphologically analyzing a sequence (e.g., sentence) by paying attention to types of nouns or pronouns.

Referring back to FIG. 3, in step S3, the data set conversion unit 13 of the learning model controller apparatus 1 converts the training data set acquired in step S1 to another training data set in which the honorific expressions are enriched.

More specifically, the data set conversion unit 13 generates a data set containing pairs of source sequences and target sequences in which the honorific expressions are enriched over the non-honorific expressions as compared to the original training data set acquired in step S1 based on the results of the analysis by the analysis unit 12, in other words, the extracted segment of interest and/or the determined honorific expression level by the analysis unit 12.

According to the present embodiment, the data set conversion unit 13 generates the converted data set by converting the segments of interest in all target sequences in the training data set acquired in step S1 into the honorific expressions.

The details of the data set conversion processing according to the present embodiment will be described below with reference to FIGS. 5 to 7.

In step S4, the output unit 14 of the learning model controller apparatus 1 outputs the training data set converted in step S3 to the converted data set storage unit 4.

In step S5, the training unit 15 of the learning model controller apparatus 1 trains the machine learning model 2 using the converted data set stored in the converted data set storage unit 4 in step S4 as the training data set. It should be noted that steps S1 to S4 are pre-processes for allowing the machine translation model 2 to machine-learn in step S5.

The machine translation model 2 may be a pre-trained machine translation model 2 that has been trained in advance on the training data set before being converted stored in the training data set storage unit 3. In this case, the training in step S5 is an additional training for the pre-trained machine translation model 2.

<Details of Data Set Conversion Processing>

FIG. 5 is a conceptual diagram illustrating the exemplary data set conversion processing performed by the data set conversion unit 13 of the learning model controller apparatus 1 according to the present embodiment.

Referring to FIG. 5, the training data set before conversion contains a pair of source sequences 51 and target sequences 52. For example, it is assumed that the source sequence 51 as the translation source is in English and the target sequence 52 as the translation target is in Japanese.

According to the present embodiment, the data set conversion unit 13 converts the target sequence 52 in the training data set to another target sequence 53, while the source sequence 51 is not converted and is output straightforwardly to the converted data set.

More specifically, the data set conversion unit 13 converts all target sequences 52 stored in the training data set into target sequences in honorific expressions 53.

Figure 6:
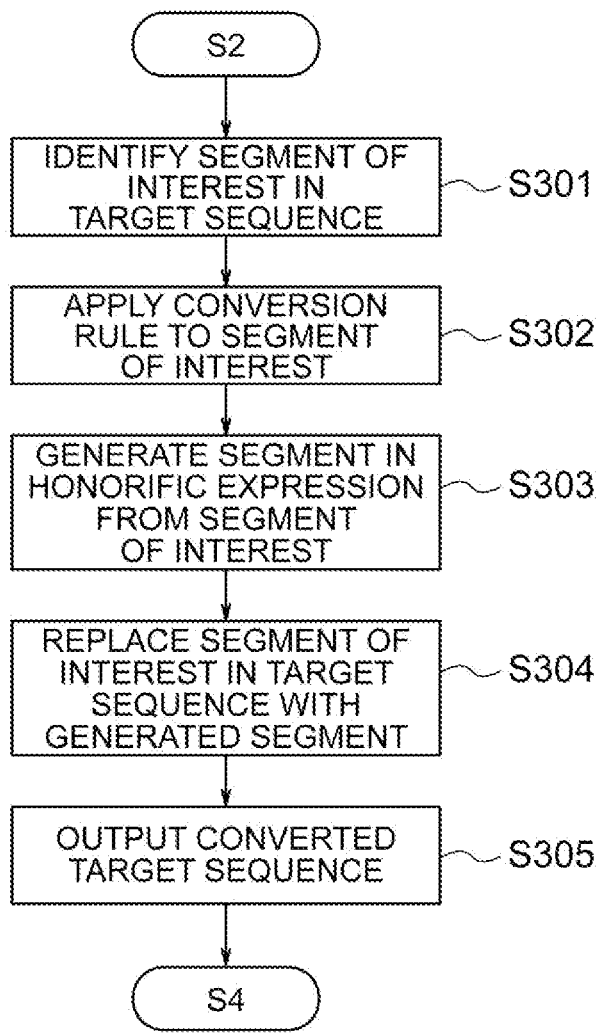
FIG. 6 is a flowchart illustrating an exemplary detailed processing procedure of the data set conversion processing performed by the data set conversion unit of the learning model controller apparatus according to the first embodiment.

FIG. 6 is a flowchart illustrating an exemplary detailed processing procedure of the data set conversion processing performed by the data set conversion unit 13 of the learning model controller apparatus 1 according to the present embodiment.

In step S301, the data set conversion unit 13 identifies the segment of interest in the target sequence 52 based on the analysis results of the training data set supplied from the analysis unit 12.

In step S302, the data set conversion unit 13 applies conversion rules for converting to the honorific expressions with respect to the segment of interest in the target sequence 52 identified in step S301.

FIG. 7 is a schematic diagram illustrating an exemplary conversion rule to the honorific expressions, which are referred to by the data set conversion unit 13 of the learning model controller apparatus 1 according to the present embodiment.

Referring to FIG. 7, the conversion rule describes the patterns of verb morphemes which are inflected for three honorific expression levels, i.e., the non-honorific (i.e., polite) expression 71, the polite expression 72, and the formal expression 73, respectively.

The verb morphemes in the non-honorific expressions 71 include "da", "datta", "dakara", "dakedo", and the like; the verb morphemes in the polite expressions 72 include "desu", "deshita", "mashou", "deshou", and the like; and the verb morphemes in the formal expressions 73 include "gozaimasu", "irasshaimasu", "itashimasu", "kudasaimasu", and the like, however, those patterns are not limited to the examples shown in FIG. 7.

The data set conversion unit 13 uses the text matching to determine which of the multiple honorific expression levels the verb morpheme described in the segment of interest in the target sequence 52 of the training data set belongs to. The data set conversion unit 13 further applies the conversion rules in FIG. 7 to identify the verb morpheme in the honorific expression, which is the conversion target for the segment of interest.

Referring back to FIG. 6, in step S303, the data set conversion unit 13 generates the segment of interest in the honorific expression from the segment of interest identified in the target sequence 52 in the training data set by applying the conversion rules in FIG. 7.

More specifically, referring to FIG. 4, assuming that the target sequence 52 in the training data set is the non-honorific expression 41, "Eki no chikaku ni takusannno omise ga aru.", then, in step S303, the data set conversion unit 13 applies the conversion rules in FIG. 7 to generate the segment of interest "arimasu", which is a polite expression belonging to the honorific expressions, from the segment of interest "aru" in the target sequence 52.

In step S303, although the data set conversion unit 13 may generate the segment of interest in any of multiple honorific expressions or segments of interest in all multiple honorific expressions from the segment of interest in the target sequence 52 in the training data set, however, hereinafter, it is assumed that the initial value in the honorific expression, which is the conversion target, is the polite expression.

On the other hand, assuming that the target sequence 52 in the training data set is the polite expression 42, "Eki no chikaku ni takusannno omise ga arimasu.", then, in step S303, the data set conversion unit 13 applies the conversion rules in FIG. 7 and determines that it is unnecessary to convert the segment of interest "arimasu" in the target sequence 52 into the polite expression.

Similarly, assuming that the target sequence 52 in the training data set is the formal expression 43, "Eki no chikaku ni takusannno omise ga gozaimasu.", then, in step S303, the data set conversion unit 13 applies the conversion rules in FIG. 7 to generate the segment of interest "arimasu", which is a polite expression belonging to the honorific expressions, from the segment of interest "gozaimasu" in the target sequence 52, which similarly belongs to the honorific expressions. Alternatively, the data set conversion unit 13 may determine that it is unnecessary to convert the segment of interest "gozaimasu" in the target sequence 52 into the polite expression.

In step S304, the dataset conversion unit 13 replaces the segment of interest in the target sequence 52 in the training dataset with the segment of interest generated in step S303, which has been converted into the honorific expression. In the example in FIG. 4, the target sequence generated in step S304 is, for example, "Eki no chikaku ni takusan no omise ga arimasu.", which ends with the honorific expression (i.e., polite expression).

In step S305, the data set conversion unit 13 outputs the target sequence 53 in which the segment of interest is replaced with the honorific expression in step S304 to the converted data set.

As explained above, according to the present embodiment, the learning model controller apparatus acquires the training data set that correlates sequences in the source language, which is the translation source, to sequences in the target language, which is the translation target, to store those sequences therein, analyzes the acquired training data set, and identifies the segment of interest that indicates the honorific expression level in the sequence in the target language. The learning model controller apparatus also converts the sequence in the target language into a sequence in the honorific expressions by generating the segment of interest in the honorific expressions from the identified segment of interest.

The learning model controller apparatus yet also machine-learns the learning model for machine translation by using the training data set after being converted.

Thus, it makes it possible to train the leaning model for machine translation using a training data set in which the honorific expressions are enriched over non-honorific expressions as compared to the training data set before being converted.

As a result, it makes it possible to achieve machine translation with higher accuracy even when the target language for machine translation contains the honorific expressions, or the like.

Second Embodiment

Hereinafter, with reference to FIGS. 8 to 10, a second embodiment according to the present invention will be described in detail, solely with respect to the features that differ from the first embodiment.

According to the first embodiment, the learning model controller apparatus 1 generates the converted data set by converting a target sequence in the training data set into a target sequence in the honorific expressions.

According to the present embodiment, the learning model controller apparatus 1 generates the converted data set in which the honorific expressions are enriched over the non-honorific expressions by generating one training data set for each of the multiple honorific expression levels from the training data set.

It should be noted that, according to the present embodiment, the data set conversion unit 13 may perform the conversion of the training data set including the conversion of the segment of interest without determining the honorific expression level of the target sentence by the analysis unit 12.

The functional configuration and the outline processing procedure of the learning model controller apparatus 1 according to the present embodiment are the same as those of the learning model controller apparatus 1 according to the first embodiment shown in FIGS. 1 and 3, respectively.

Figure 8:
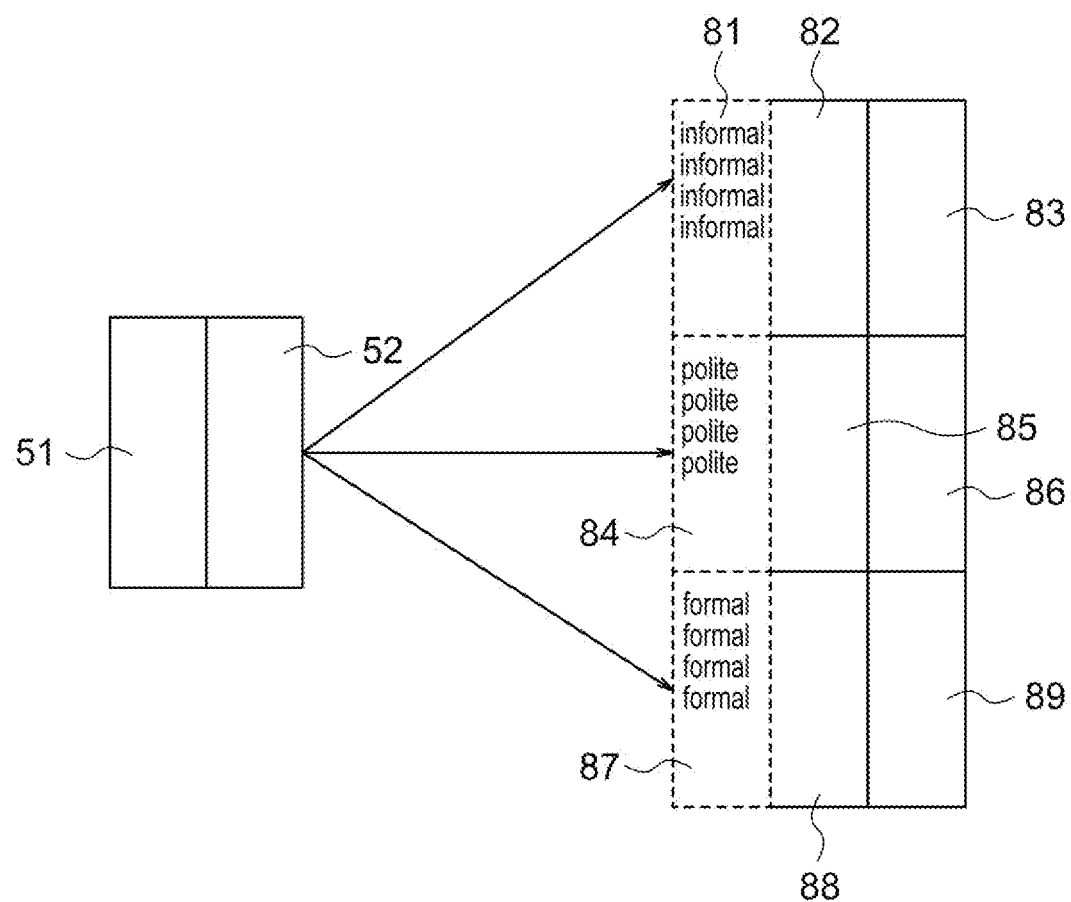
FIG. 8 is a schematic diagram illustrating an exemplary data set conversion processing performed by the data set conversion unit of the learning model controller apparatus according to a second embodiment.

FIG. 8 is a conceptual diagram illustrating exemplary data set conversion processing performed by the data set conversion unit 13 of the learning model controller apparatus 1 according to the present embodiment.

Referring to FIG. 8, the training data set before being converted includes pairs of the source sequences 51 and the target sequences 52. For example, it is assumed that the source sequence 51 as the translation source is in English and the target sequence 52 as the translation target is in Japanese.

According to the present embodiment, the data set conversion unit 13 generates one data set for each of the multiple honorific expression levels, i.e., a total of three sets of semantically equivalent data set, from the pairs of the source sequences 51 and the target sequences 52 in the training data set.

More specifically, a first data set is a data set of the non-honorific expressions, and each of sequences in the first data set includes a tag 81 indicating to be the non-honorific expression (i.e., informal), the source sequence 82, and the target sequence 83 in the non-honorific expression. A second data set is a dataset of the polite expressions belonging to the honorific expressions, and each of sequences in the second data set includes a tag 84 indicating to be the polite expression, the source sequence 85, and a target sequence 86 in the polite expression. Similarly, a third data set is a data set of the formal expressions belonging to the honorific expressions, and each of sequences in the third data set includes a tag 87 indicating to be the formal expression, the source sequence 88, and the target sequence 89 in the formal expression.

The source sequence 51 in the training data set may be straightforwardly output to the source sequences 82, 85, and 88 of the first to third data sets, respectively, without being converted. On the other hand, the target sequence 52 in the training data set is converted and output into the target sequences 83, 86, and 89 in the three honorific expression levels, respectively.

Figure 9:
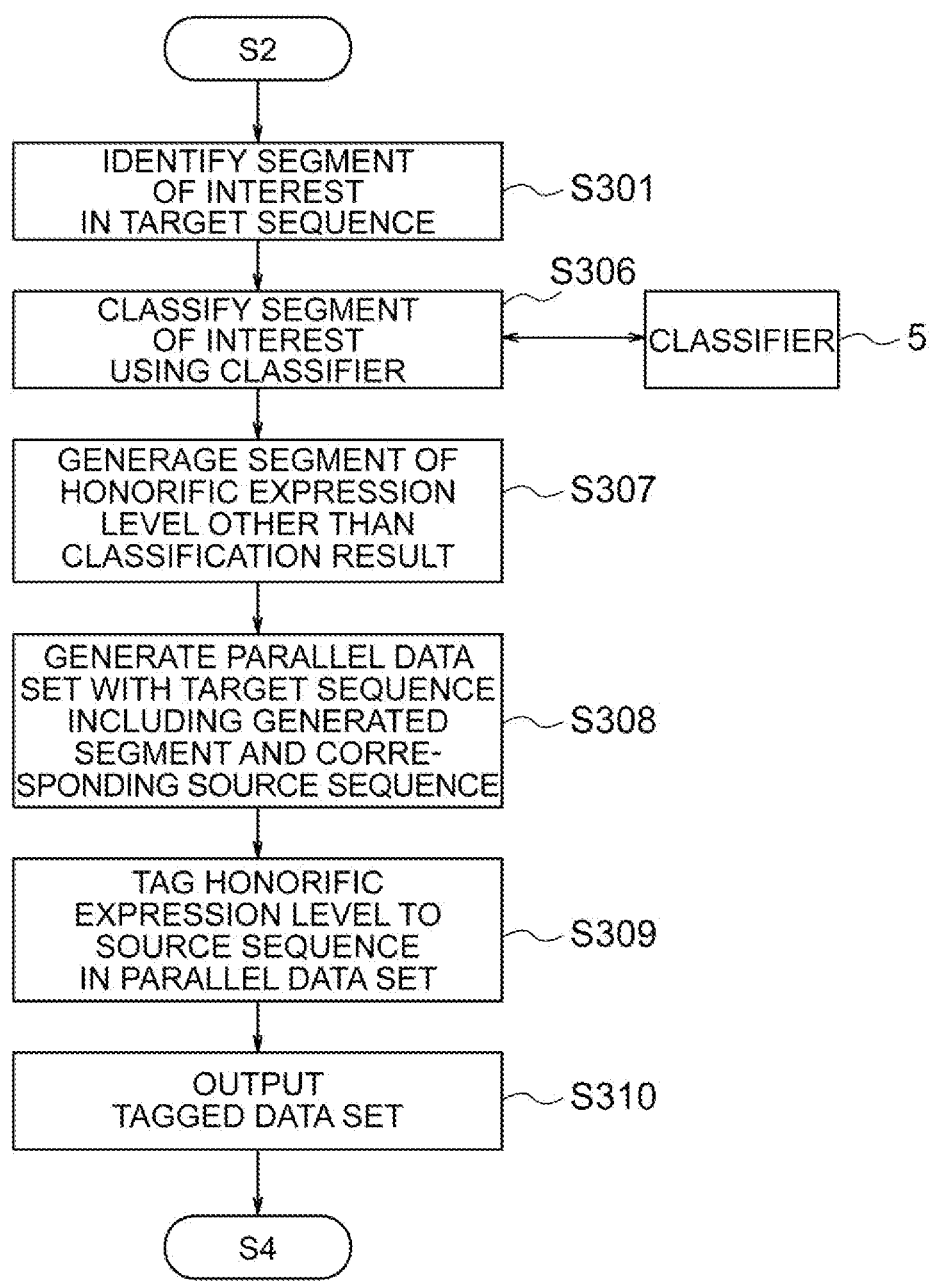
FIG. 9 is a flowchart illustrating an exemplary detailed processing procedure of the data set conversion processing performed by the data set conversion unit of the learning model controller apparatus according to the second embodiment.

FIG. 9 is a flowchart illustrating an exemplary detailed processing procedure of the data set conversion processing performed by the data set conversion unit 13 of the learning model controller apparatus 1 according to the present embodiment.

In step S301, similarly to the first embodiment, the data set conversion unit 13 identifies the segment of interest in the target sequence 52 based on the analysis results of the training data set supplied from the analysis unit 12.

Subsequently to step S301, in step S306, the data set conversion unit 13 classifies the segment of interest in the target sequence 52, which is identified in step S301, using a classifier 5.

More specifically, the classifier 5 classifies the segment of interest in the target sequence 52 into one of the multiple honorific expression levels: the non-honorific level, the polite level, and the formal level.

In step S307, the data set conversion unit 13 generates segments that are described in the honorific expression levels other than the honorific expression level into which the segment of interest in the target sequence 52 has been classified.

For example, assuming that the segment of interest in the target sequence 52 is classified into the non-honorific expression by the classifier 5 in step S306, then in step S307, the data set conversion unit 13 generates a segment in the polite expression level and a segment in the polite expression level from the segment of interest, respectively. Similarly, assuming that the segment of interest in the target sequence 52 is classified into the polite expression by the classifier 5 in step S306, then in step S307, the data set conversion unit 13 generates a segment in the non-honorific expression level and a segment in the formal expression level from the segment of interest, respectively. Yet similarly, assuming that the segment of interest in the target sequence 52 is classified into the formal expression by the classifier 5 in step S306, then in step S307, the data set conversion unit 13 generates a segment in the non-honorific expression level and a segment in the formal expression level from the segment of interest, respectively.

It should be noted that the classifier 5 may be constituted with, for example, a Transformer based model, or any kind of trained machine learning model such as the CNN.

In step S308, the data set conversion unit 13 correlates the target sequences 83, 86, and 89 containing the segments generated in step S307 to the corresponding source sequences 82, 85, and 88 as pairs, respectively, to generate multiple parallel data sets for the multiple honorific expression levels, respectively.

In step S309, the data set conversion unit 13 assigns or appends the corresponding honorific expression level as a tag, which is equivalent to a label or token, to each of source sequences 82, 85, and 88 in the multiple parallel data sets generated in step S308.

Referring to FIG. 8, the data set of the non-honorific expressions includes a pair of the source sequence 82 to which a non-honorific (i.e., informal) tag 81 is assigned and the target sequence 83 that ends with a segment in the non-honorific expression. The data set of the polite expressions includes a pair of the source sequence 85 to which a polite tag 84 is assigned and the target sequence 86 that ends with a segment in the polite expression. Similarly, the data set of the formal expressions includes a pair of the source sequence 88 to which a formal tag 87 is assigned and the target sequence 89 that ends with a segment in the formal expression. On the other hand, the source sequence 51 may be straightforwardly output to the source sequences 82, 85, and 88, respectively, without being converted.

FIG. 10 is a schematic diagram illustrating an exemplary tagging (i.e., labeling) of honorific expression levels to source sentences in the data set conversion processing according to the present embodiment.

Referring to FIG. 10, it is assumed that the source language as the translation source is in English and the target language as the translation target is in Japanese, and in the training data set, the English source sequence 101 "The number at the bottom of the list drops off." is correlated to the Japanese target sequence 103 "List no ichiban shita ni aru bangou ga list kara sakujo saremasu.". In this case, in step S309, the data set conversion unit 13 assigns a polite expression tag <polite> (equivalent to a label or token) to the source sequence 101 to generate a source sequence 102 tagged with the honorific expression level of the polite expression.

In step 309, the tags of the honorific expression levels as the classification results, which are assigned to the source sequences 82, 83, and 88, respectively, are input to the machine translation model 2 as additional features of the parallel data sets and undergo machine learning. In this case, in the inference phase, a pre-processing step may be performed to assign a predetermined honorific expression level as a tag to the source sequence input to the machine translation model 2, and the assigned honorific expression levels may be extracted as additional features of the source sequence.

Referring back to FIG. 9, in step S310, the data set conversion unit 13 of the learning model controller apparatus 1 outputs multiple parallel data sets with honorific expression levels being assigned to source sequences 82, 85, and 88, respectively, to the converted data set storage unit 4.

According to the present embodiment, multiple training data sets corresponding to the multiple honorific expression levels, respectively, are generated from a single training data set. As a result, it makes it possible to train the same machine translation model 2 more deeply with greater amount of training data in which the honorific expressions are enriched.

Third Embodiment

Hereinafter, with reference to FIGS. 11 and 12, a third embodiment according to the present invention will be described in detail, solely with respect to the features that differ from the above embodiments.

According to the present embodiment, the learning model controller apparatus 1 generates the converted data set by assigning a tag indicating one of the multiple honorific expression levels to the source sequence in the training data set.

The functional configuration and the outline processing procedure of the learning model controller apparatus 1 according to the present embodiment are the same as those of the learning model controller apparatus 1 according to the first embodiment shown in FIGS. 1 and 3, respectively.

Figure 11:
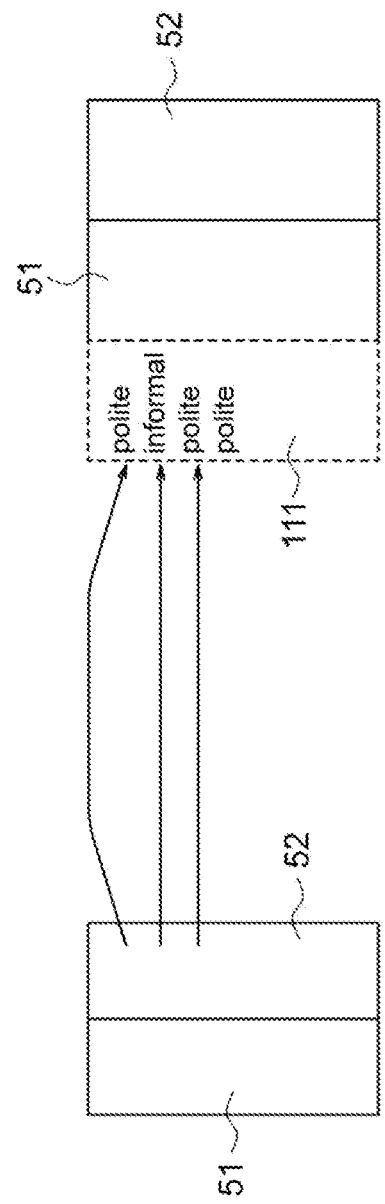
FIG. 11 is a schematic diagram illustrating an exemplary data set conversion processing performed by the data set conversion unit of the learning model controller apparatus according to a third embodiment.

FIG. 11 is a conceptual diagram illustrating exemplary data set conversion processing performed by the data set conversion unit 13 of the learning model controller apparatus 1 according to the present embodiment.

Referring to FIG. 11, the training data set before being converted includes pairs of the source sequences 51 and the target sequences 52. For example, it is assumed that the source sequence 51 as the translation source is in English and the target sequence 52 as the translation target is in Japanese.

According to the present embodiment, the data set conversion unit 13 classifies the honorific expression level of the target sequence 52 in the training data set, assigns one of the honorific expression levels, which is the classification result, as a tag 11 to the source sequence 51, and generates the converted data set. On the other hand, the dataset conversion unit 13 may not convert the target sequence 52 of the training data set but straightforwardly output the target sequence 52 to the converted data set.

Figure 12:
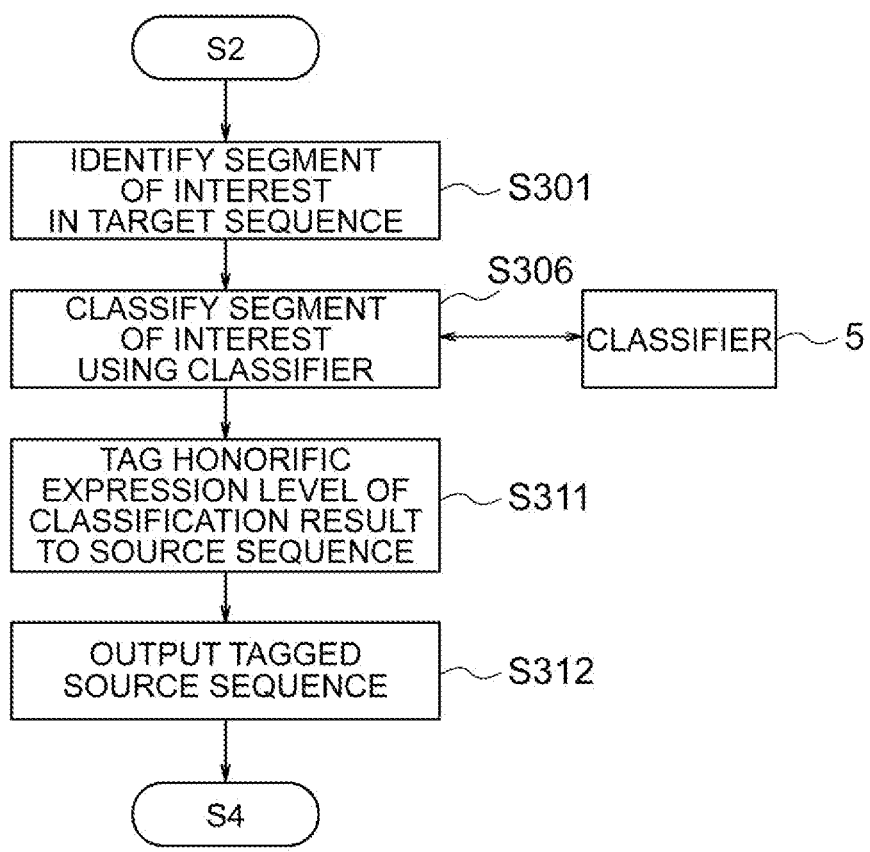
FIG. 12 is a flowchart illustrating an exemplary detailed processing procedure of the data set conversion processing performed by the data set conversion unit of the learning model controller apparatus according to the third embodiment.

FIG. 12 is a flowchart illustrating an exemplary detailed processing procedure of the data set conversion processing performed by the data set conversion unit 13 of the learning model controller apparatus 1 according to the present embodiment.

In step S301, similarly to the above embodiments, the data set conversion unit 13 identifies the segment of interest in the target sequence 52 based on the analysis results of the training data set supplied from the analysis unit 12.

Subsequently to step S301, in step S306, the data set conversion unit 13 classifies the segment of interest in the target sequence 52, which is identified in step S301, using the classifier 5.

More specifically, the classifier 5 classifies the segment of interest in the target sequence 52 into one of multiple honorific expression levels: the non-honorific expression level; the polite expression level; and the formal expression level.

Subsequently to step S306, in step S311, the data set conversion unit 13 assigns one of the honorific expression levels, which is the classification results in step S306, as a tag (equivalent to label or token) to the source sequence 51. The source sequence 51 is tagged with one of the honorific expression levels, which is the classification result of the corresponding target sequence 52, i.e., the non-honorific tag <informal>, the polite tag <polite>, or the formal tag <formal> as the tag 111.

The honorific expression level tags as the classification results, which are assigned to the source sequences 51 in step S311, are input to the machine translation model 2 as additional features of the converted data set, and then undergo machine learning. In this case, in the inference phase, a pre-processing step may be performed to assign a predetermined honorific expression level as a tag to the source sequence to be input to the machine translation model 2, and the assigned honorific expression levels may be extracted as additional features of the source sequence.

Referring back to FIG. 12, in step S312, the data set conversion unit 13 of the learning model controller apparatus 1 outputs a parallel data set in which the honorific expression level is assigned to the source sequence 51 to the converted data set storage unit 4. In the converted data set, the target sequence 52 that is to be originally processed as the honorific expression by the machine translation model is clarified to belong to the honorific expressions by tagging of the polite expression tag or the formal expression tag to the corresponding source sequence 51 without erroneously being processed as the non-honorific expression level. Resultantly, a data set in which the honorific expressions are enriched is generated as well.

According to the present embodiment, the original target sequence 52 stored in the training data set storage unit 3 is straightforwardly provided as the training data for training the machine translation model 2. As a result, it makes it possible to train the machine translation model 2 using the training data set in which the honorific expressions are enriched as compared to the case that requires the sequence conversion from the original target sequence 52 to a predetermined honorific expression level, while maintaining the quality of the target sequence 52 in the training data.

Fourth Embodiment

Hereinafter, with reference to FIGS. 13 and 14, a fourth embodiment according to the present invention will be described in detail, solely with respect to the features that differ from the above embodiments.

According to the present embodiment, the learning model controller apparatus 1 generates the converted data set by extracting a target sequence in the honorific expression and a corresponding source sequence from the training data set.

The functional configuration and the outline processing procedure of the learning model controller apparatus 1 according to the present embodiment are the same as those of the learning model controller apparatus 1 according to the first embodiment shown in FIGS. 1 and 3, respectively.

Figure 13:
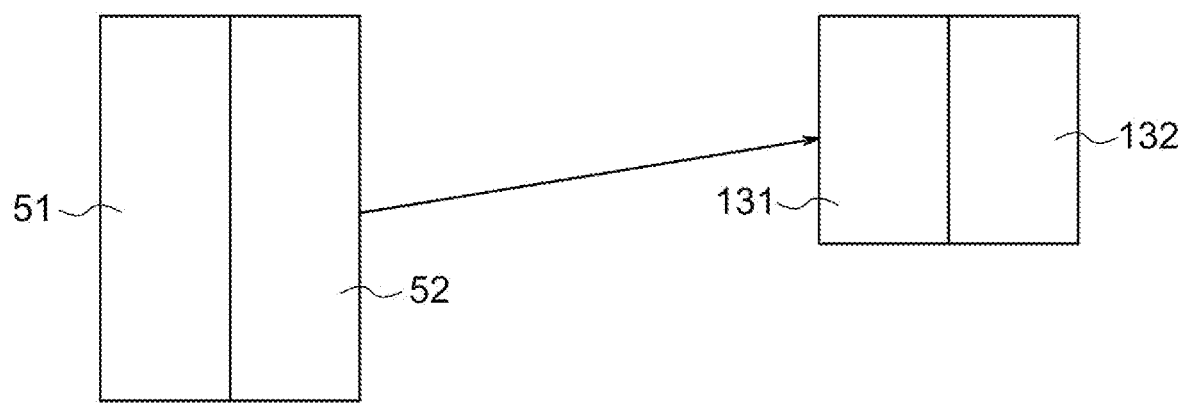
FIG. 13 is a schematic diagram illustrating an exemplary data set conversion processing performed by the data set conversion unit of the learning model controller apparatus according to a fourth embodiment.

FIG. 13 is a conceptual diagram illustrating exemplary data set conversion processing performed by the data set conversion unit 13 of the learning model controller apparatus 1 according to the present embodiment.

Referring to FIG. 13, the training data set before being converted includes pairs of the source sequences 51 and the target sequences 52. For example, it is assumed that the source sequence 51 as the translation source is in English and the target sequence 52 as the translation target is in Japanese.

According to the present embodiment, the dataset conversion unit 13 extracts a target sequence 132 belonging to the honorific expressions from the target sequences 52 in the training data set, extracts the source sequence 131 corresponding to the extracted target sequences 132, and outputs the extracted target sequence 132 and the source sequence 131 as a pair to the converted data set. In other words, the converted data set is a subset of the original training data set.

Figure 14:
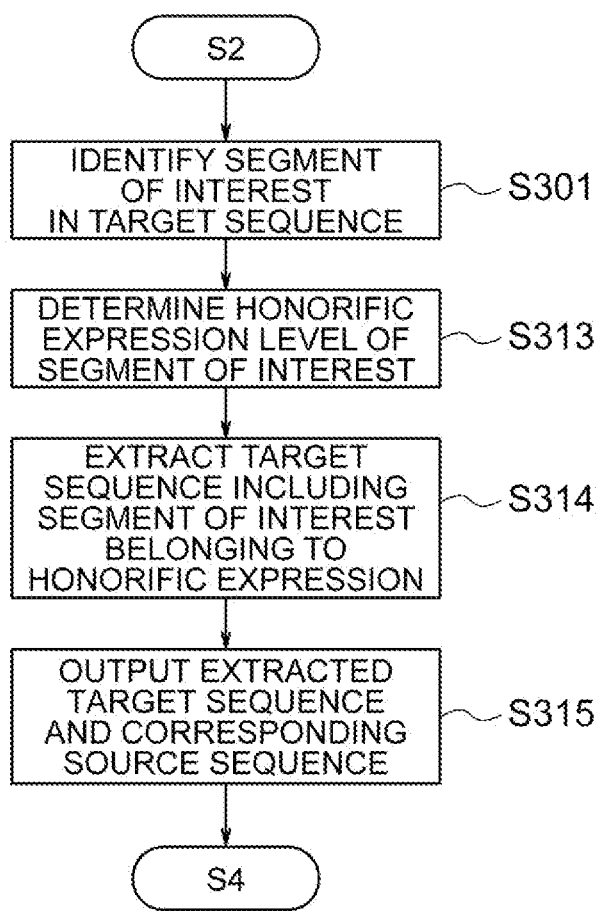
FIG. 14 is a flowchart illustrating an exemplary detailed processing procedure of the data set conversion processing performed by the data set conversion unit of the learning model controller apparatus according to the fourth embodiment.

FIG. 14 is a flowchart illustrating an exemplary detailed processing procedure of the data set conversion processing performed by the data set conversion unit 13 of the learning model controller apparatus 1 according to the present embodiment.

In step S301, similarly to the above embodiments, the data set conversion unit 13 identifies the segment of interest in the target sequence 52 based on the analysis results of the training data set supplied from the analysis unit 12.

Subsequently to step S301, in step S313, the data set conversion unit 13 determines the honorific expression level of the segment of interest in the target sequence 52, which is identified in step S301.

More specifically, the data set conversion unit 13 determines to which honorific expression level the segment of interest belongs from the multiple honorific expression levels: the non-honorific expression level; the polite expression level; and the formal expression level. In order to determine the honorific expression level with the segment of interest, the honorific expression level may be determined by text matching with reference to the conversion rules in FIG. 7, or alternatively the segment of interest may be classified into one of the honorific expression levels using the classifier 5.

In step S314, the data set conversion unit 13 extracts from the training data set the target sequence including the segment of interest that is determined to belong to the honorific expressions in step S313. For example, the data set conversion unit 13 may extract a target sequence with the honorific expression level of the polite expression.

In step S315, the data set conversion unit 13 correlates the target sequence 132 belonging to the honorific expressions, which is extracted in step S314, to the source sequence 131 corresponding to the extracted target sequence 132 as a pair to generate the converted data set, and outputs the generated data set to the converted data set storage unit 4. In the converted data set, the target sequences belonging to the honorific expressions and corresponding source sequences are solely extracted. Resultantly, a data set in which the honorific expressions are enriched is generated as well.

According to the present embodiment, similarly to the third embodiment, the original target sequence 52 stored in the training data set storage unit 3 is straightforwardly provided as the training data for training the machine translation model 2. As a result, it makes it possible to train the machine translation model 2 using the training data set in which the honorific expressions are enriched as compared to the case that requires the sequence conversion from the original target sequence 52 to a predetermined honorific expression level, while maintaining the quality of the target sequence 52 in the training data.

<Hardware Configuration of Learning Model Controller Apparatus>

Figure 15:
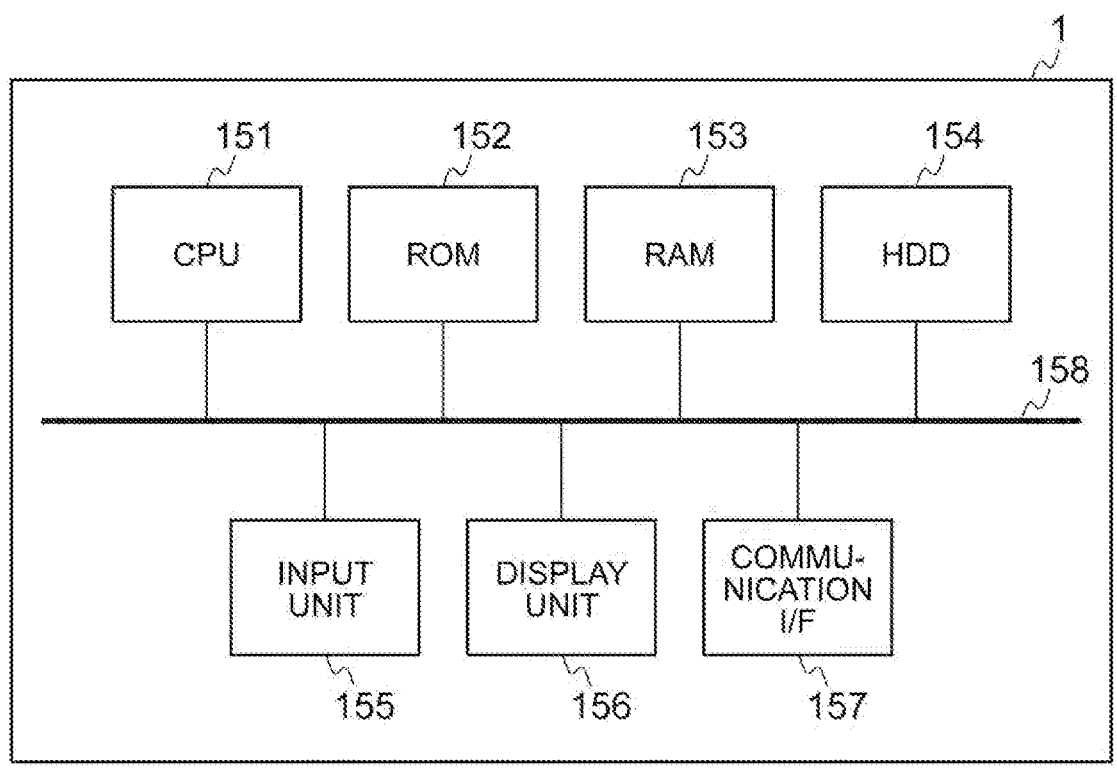
FIG. 15 is a block diagram illustrating an exemplary hardware configuration of the learning model controller apparatus according to the respective embodiments of the present invention.

FIG. 15 is a diagram showing a non-limiting exemplary hardware configuration of the learning model controller apparatus 1 according to the present embodiment.

The learning model controller apparatus 1 according to the present embodiment can be implemented on any one or more computers, mobile devices, or any other processing platform.

Referring to FIG. 15, the learning model controller apparatus 1 is shown as being implemented on a single computer, however, the learning model controller apparatus 1 according to the present embodiment may be implemented on a computer system including multiple computers. The multiple computers may be inter-communicatively connected by a wired or wireless network.

As shown in FIG. 15, the learning model controller apparatus 1 includes a CPU 151, a ROM 152, a RAM 153, an HDD 154, an input unit 155, a display unit 156, a communication I/F 157, and a system bus 158. The learning model controller apparatus 1 may also incorporate an external memory.

The CPU 151 controls operations of the learning model controller apparatus 1 in an integrated manner and controls the respective components (152 to 157) via the system bus 158 serving as a data transmission channel. It should be noted that, in place of or in addition to the CPU 151, the learning model controller apparatus 1 may also be equipped with a GPU (Graphics Processing Unit), and the GPU may be used to perform the learning and inference processing for a learning model such as the machine translation model 2.

The ROM (Read Only Memory) 152 is a non-volatile memory that stores a control program or the like required for CPU 151 to execute the processes. Instead, the program may be stored in a non-volatile memory such as the HDD (Hard Disk Drive) 154 or an SDD (Solid State Drive) or the like, or an external memory such as a removable storage medium (not shown).

The RAM (Random Access Memory) 153 is a volatile memory and functions as a main memory or a work area, or the like, for the CPU 151. In other words, the CPU 151 loads a required program or the like from the ROM 152 into the RAM 153 at the time of executing the processes and executes the program or the like to realize various functional operations.

The HDD 154 stores, for example, various data and various information required when the CPU 151 performs a process using a program. Furthermore, the HDD 154 stores, for example, various data and various information obtained by the CPU 151 performing a process using a program or the like.

The input unit 155 is constituted with a keyboard or a pointing device such as a mouse.

The display unit 156 is constituted with a monitor such as a liquid crystal display (LCD). The display unit 156 may provide a GUI (Graphical User Interface) for input various parameters used in the graph image analysis processing and communication parameters used in communication with external devices, and the like, to the learning model controller apparatus 1.

The communication I/F 157 is an interface for controlling communication between the learning model controller apparatus 1 and the external devices.

The communication I/F 157 provides an interface to the network and executes communication with external devices via the network. Image data, various parameters, and other data are sent and received to and from the external device via the communication I/F 157. According to the present embodiment, the communication I/F 157 may execute communication via a wired LAN (Local Area Network) that conforms to communication standards such as Ethernet (registered trademark) or leased line. However, the network available in the present embodiment is not limited thereto and may be constituted with a wireless network. The wireless network may include a wireless PAN (Personal Area Network) such as Bluetooth (registered trademark), ZigBee (registered trademark), UWB (Ultra Wide Band), and the like. The wireless network may also include a wireless MAN (Metropolitan Area Network) such as Wi-Fi (Wireless Fidelity) (registered trademark), and the like. The wireless network may further include a wireless WAN (Wide Area Network) such as LTE/3G, 4G, 5G, and the like. It should be noted that the network need only be capable of connecting respective devices and allowing them to communicate with each other, and the communication standards, scale, and configuration are not limited to the above.

Functions of at least some of the elements of the learning model controller apparatus 1 shown in FIG. 1 may be realized by the CPU 151 executing programs. Nevertheless, at least a part of the functions of the elements of the learning model controller apparatus 1 shown in FIG. 1 may operate as a dedicated hardware. In this case, the dedicated hardware operates based on the control of the CPU 151.

Although specific embodiments have been described above, the embodiments described are illustrative only and are not intended to limit the scope of the present invention. The apparatus and method described herein may be embodied in other forms than as described above. In addition, it is also possible to appropriately omit, substitute, or modify the above described embodiments without departing from the scope of the present invention. Embodiments with such omissions, substitutions and modifications fall within the scope of the appended claims and equivalents thereof and also fall within the technical scope of the present invention.

REFERENCE SIGNS LIST

1: Learning Model Controller Apparatus; 2: Machine Translation Model; 3: Training Data Set Storage Unit; 4: Converted Data Set Storage Unit; 5: Classifier; 21,22: Encoders; 23,24: Decoders; 25: Linear Processing Unit; 26: Softmax; 151: CPU; 152: ROM; 153: RAM; 154: HDD; 155: Input Unit; 156: Display Unit; 157: Communication I/F; 158: System Bus

What is claimed is:

1. An information processing apparatus, comprising:
at least one memory configured to store program code;
at least one processor configured to operate as instructed by the program code, the program code including:
acquisition code configured to cause at least one of the at least one processor to acquire a first training data set that stores training data in which a first natural language sequence, which is a machine translation source, is correlated to a second natural language sequence, which is a machine translation target;
analysis code configured to cause at least one of the at least one processor to extract a segment indicating either non-honorific or honorific expressions from the second natural language sequence in the first training data set acquired-, wherein the segment comprises an inflectable portion at which different inflected words are described at the end of a sentence at different honorific expression levels, and analyze the extracted segment based on morphological analysis of inflection patterns;

conversion code configured to cause at least one of the at least one processor to convert, based on an analysis result of the segment-, the first training data set into a second training data set that is different from the first training data set and in which the honorific expression in the second natural language sequence is modified to replace at least a portion of the non-honorific expression; or is supplemented with additional honorific expressions, and convert the segment in target sequences into honorific expressions at a grammatical level by generating segments in honorific expression levels from the segment based on conversion rules that define morpheme patterns for multiple honorific expression;

training code configured to cause at least one of the at least one processor to input the second training data set converted into a learning model to train the learning model, and output target sequences corresponding to different honorific expression levels based on contextual or user-specified requirements, wherein the learning model is configured for neural machine translation between the first natural language and the second natural language wherein the learning model comprises an encoder section including a stack of encoders shared across honorific levels to process the first natural language sequence and a decoder section including a plurality of output channels, each output channel being associated with one of a non-honorific expression or a particular honorific expression level, and each output channel being configured to generate the second natural-language sequence corresponding to its associated honorific expression level, wherein the encoder section and decoder section are configured to form a sequence-to-sequence neural network architecture for translating between languages.

2. The information processing apparatus according to claim 1, wherein
the analysis code is further configured to cause at least one of the at least one processor to extract, as the segment, the inflectable portion from the second natural language sequence in the first training data set, and
wherein the inflectable portion comprises at least one or more of: a verb conjugation, or a prefix.

3. The information processing apparatus according to claim 1, wherein the program code further includes:
classifier code configured to cause at least one of the at least one processor configured to classify the segment extracted into any of honorific expression levels, and
wherein the conversion code is further configured to cause at least one of the at least one processor to convert the first training data set to the second training data set based on a classification result of the honorific expression levels output.

4. The information processing apparatus according to claim 3, wherein
the conversion code is further configured to cause at least one of the at least one processor to assign the classification result of the honorific expression levels output to the first natural language sequence to be stored in the second training data set.

5. The information processing apparatus according to claim 1, wherein
the conversion code is further configured to cause at least one of the at least one processor to replace the segment in the second natural language sequence with a segment in the honorific expression and outputs the second natural language sequence to the second training data set.

6. The information processing apparatus according to claim 5, wherein
the conversion code is further configured to cause at least one of the at least one processor to refer to a conversion rule that defines a verb morpheme for each of the honorific expression levels, and convert, using text matching, the segment in the second natural language sequence into a segment in the honorific expression to be output to the second training data set.

7. The information processing apparatus according to claim 1, wherein
the conversion code is further configured to cause at least one of the at least one processor to generate a segment indicating an honorific expression level other than an honorific expression level indicated by the segment extracted, generate the second natural language sequence including the generated segment, and generate a plurality of said second training data sets corresponding to a plurality of said second natural language sequences, respectively.

8. The information processing apparatus according to claim 1, wherein
the conversion code is further configured to cause at least one of the at least one processor to identify a segment indicating the honorific expression among the segments extracted, and output, to the second training data set, the second natural language sequence including the identified segment and the corresponding first natural language sequence.

9. The information processing apparatus according to claim 1, wherein
the conversion code is further configured to cause at least one of the at least one processor to convert the first training data set into the second training data set in which a lower honorific expression is enriched over the non-honorific expression among multiple honorific expression levels belonging to the honorific expression.

10. The information processing apparatus according to claim 1, wherein
the learning model has a plurality of output channels that corresponds to the non-honorific expression and the honorific expression, respectively.

11. The information processing apparatus according to claim 1,
wherein the conversion code is further configured to replace the extracted segment with a segment in an honorific expression determined by morphological analysis of the extracted segment and outputting the second natural language sequence with the replaced segment to the second training data set.

12. The information processing apparatus according to claim 1,
wherein the conversion code is further configured to cause at least one of the at least one processor to generate a plurality of semantically equivalent second training data sets from a single training data pair, wherein a first data set includes a tag indicating non-honorific expression, a second data set includes a tag indicating polite expression belonging to honorific expressions, and a third data set includes a tag indicating formal expression belonging to honorific expressions, and wherein each tag is assigned to the first natural language sequence in the respective data set.

13. The information processing apparatus according to claim 1, wherein the analysis code is further configured to cause at least one of the at least one processor to extract the segment based on inflection in the second natural language sequence, and determine the honorific expression level by analyzing the inflection caused by the conjugation of verbs in the sequence.

14. The information processing apparatus according to claim 1, wherein the learning model comprises a Transformer based model configured to perform neural machine translation, and wherein the encoder section comprises stacked multiple encoders processing each element in the first natural language sequence as an input word, and the decoder section comprises stacked multiple decoders processing each element in the second natural language sequence as an output word.

15. An information processing method, performed by at least one processor and comprising:
   acquiring a first training data set that stores training data in which a first natural language sequence, which is a machine translation source, is correlated to a second natural language sequence, which is a machine translation target;
   extracting a segment indicating either non-honorific or honorific expressions from the second natural language sequence in the acquired first training data set, wherein the segment comprises an inflectable portion at which different inflected words are described at the end of a sentence at different honorific expression levels, and analyzing the extracted segment based on morphological analysis of inflection patterns;
   converting, based on an analysis result of the segment, the first training data set into a second training data set that is different from the first training data set and in which the honorific expression in the second natural language sequence is modified to replace at least a portion of the non-honorific expression, or supplemented with additional honorific expressions, and converting the segment in target sequences into honorific expressions at a grammatical level by generating segments in honorific expression levels from the segment based on conversion rules that define morpheme patterns for multiple honorific expression; and
   inputting the converted second training data set into a learning model to train the learning model, and outputting target sequences corresponding to different honorific expression levels based on contextual or user-specified requirements,
   wherein the learning model is configured for neural machine translation between the first natural language and the second natural language,
   wherein the learning model comprises an encoder section including a stack of encoders shared across honorific levels to process the first natural language sequence and a decoder section including a plurality of output channels, each output channel being associated with one of a non-honorific expression or a particular honorific expression level, and each output channel being configured to generate the second natural-language sequence corresponding to its associated honorific expression level,
   wherein the encoder section and decoder section are configured to form a sequence-to-sequence neural network architecture for translating between languages.

16. A non-transitory computer readable medium storing a computer program that when executed by at least one processor, causes the at least one processor to:
   acquire a first training data set that stores training data in which a first natural language sequence, which is a machine translation source, is correlated to a second natural language sequence, which is a machine translation target;
   extract a segment indicating either non-honorific or honorific expressions from the second natural language sequence in the first training data set acquired-, wherein the segment comprises an inflectable portion at which different inflected words are described at the end of a sentence at different honorific expression levels, and analyze the extracted segment based on morphological analysis of inflection patterns;
   convert, based on an analysis result of the segment, the first training data set into a second training data set that is different from the first training data set and in which the honorific expression in the second natural language sequence is modified to replace at least a portion of the non-honorific expression, or supplemented with additional honorific expressions, and convert the segment in target sequences into honorific expressions at a grammatical level by generating segments in honorific expression levels from the segment based on conversion ruls that define morpheme patterns for multiple honorific expression; and
   input the second training data set converted into a learning model to train the learning model, and output target sequences corresponding to different honorific expression levels based on contextual or user-specified requirements,
   wherein the learning model is configured for neural machine translation between the first natural language and the second natural language,
   wherein the learning model comprises an encoder section including a stack of encoders shared across honorific levels to process the first natural language sequence and a decoder section including a plurality of output channels, each output channel being associated with one of a non-honorific expression or a particular honorific expression level, and each output channel being configured to generate the second natural-language sequence corresponding to its associated honorific expression level,
   wherein the encoder section and decoder section are configured to form a sequence-to-sequence neural network architecture for translating between languages.

* * * * *